(12) United States Patent
Liu et al.

(10) Patent No.: US 12,507,164 B2
(45) Date of Patent: Dec. 23, 2025

(54) RELAY COMMUNICATION METHOD AND DEVICE

(71) Applicant: GUANGDONG OPPO MOBILE TELECOMMUNICATIONS CORP., LTD., Dongguan (CN)

(72) Inventors: Jianhua Liu, Dongguan (CN); Haorui Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 490 days.

(21) Appl. No.: 17/991,231

(22) Filed: Nov. 21, 2022

(65) Prior Publication Data

US 2023/0090887 A1 Mar. 23, 2023

Related U.S. Application Data

(63) Continuation of application No. PCT/CN2020/109018, filed on Aug. 13, 2020.

(51) Int. Cl.
*H04W 48/18* (2009.01)
*H04W 48/16* (2009.01)
*H04W 84/04* (2009.01)

(52) U.S. Cl.
CPC ........... *H04W 48/18* (2013.01); *H04W 48/16* (2013.01); *H04W 84/042* (2013.01)

(58) Field of Classification Search
CPC ... H04W 48/18; H04W 48/16; H04W 84/042; H04W 8/005; H04W 88/04; H04W 40/22; H04W 36/14; H04W 48/08
See application file for complete search history.

(56) References Cited

U.S. PATENT DOCUMENTS

| | | | |
|---|---|---|---|
| 2016/0285539 A1 | 9/2016 | Sadiq et al. | |
| 2018/0295497 A1 | 10/2018 | Kim et al. | |
| 2020/0045626 A1 | 2/2020 | Kim et al. | |
| 2020/0100174 A1* | 3/2020 | Kim | H04W 8/20 |
| 2020/0137680 A1* | 4/2020 | Byun | H04W 76/27 |
| 2020/0178343 A1 | 6/2020 | Kim et al. | |

(Continued)

FOREIGN PATENT DOCUMENTS

| | | |
|---|---|---|
| CN | 105009610 A | 10/2015 |
| CN | 106162676 A | 11/2016 |
| CN | 106304258 A | 1/2017 |

(Continued)

OTHER PUBLICATIONS

Extended European Search Report issued in corresponding European application No. 20949092.9, mailed Apr. 24, 2023.

(Continued)

*Primary Examiner* — Kyaw Z Soe
(74) *Attorney, Agent, or Firm* — BAYES PLLC

(57) ABSTRACT

Provided are a relay communication method and device. A remote user equipment can select a relay device on the basis of a selected PLMN, such that only different PLMNs with relay protocols can relay services to each other, thereby optimizing relay communication. The relay communication method comprises: a remote device selecting a target PLMN; and the remote device selecting a target relay device according to the target PLMN.

18 Claims, 4 Drawing Sheets

(56) References Cited

U.S. PATENT DOCUMENTS

| | | | | |
|---|---|---|---|---|
| 2020/0275352 A1* | 8/2020 | Yang | ............... | H04W 48/16 |
| 2021/0204206 A1* | 7/2021 | Kim | ............... | H04W 56/00 |

FOREIGN PATENT DOCUMENTS

| | | | |
|---|---|---|---|
| CN | 106572514 | A | 4/2017 |
| CN | 111527770 | A | 8/2020 |
| JP | 2018515969 | A | 6/2018 |
| KR | 20170035328 | A | 3/2017 |
| RU | 2703512 | C2 | 10/2019 |
| WO | 2016165134 | A1 | 10/2016 |
| WO | 2018174492 | A1 | 9/2018 |
| WO | 2019174440 | A1 | 9/2019 |
| WO | 2021030965 | A1 | 2/2021 |

OTHER PUBLICATIONS

First Office Action issued in corresponding Indian application No. 202227077219, mailed Jun. 23, 2023.

Notice of Allowance issued in corresponding Russian application No. 2022133050, mailed Nov. 3, 2023.

First Office Action issued in corresponding European application No. 20949092.9, mailed Nov. 9, 2023.

Qualcomm Incorporated, "Additional considerations for Layer-2 UE-to-Network Relay solution", S2-2004290, SA WG2 Meeting #139E (e-meeting) Elbonia, Jun. 1-12, 2020.

International Search Report issued in International application No. PCT/CN2020/109018, mailed May 6, 2021.

Written Opinion of the International Searching Authority issued in International application No. PCT/CN2020/109018, mailed May 6, 2021.

3GPP TS 38.300 V16.0.0 (Dec. 2019); Technical Specification Group Radio Access Network; NR; NR and NG-RAN Overall Description; Stage 2 (Release 16).

OPPO, "ProSe_Solution update for solution #19", S2-2003851, SA WG2 Meeting #139E Jun. 1-12, 2020, Elbonia.

Huawei et al., "Resolution of Solution#7's ENs", S2-2000494, SA WG2 Meeting #136AH Incheon, South Korea, Jan. 13-17, 2020.

Substantive Examination Report Stage I issued in corresponding Indonesian Application No. P00202214944, mailed on Jan. 30, 2025, 5 pages.

Notice of Allowance issued in corresponding European application No. 20949092.9, mailed May 21, 2024.

Priority Review issued in corresponding Chinese application No. 202310102555.6, mailed May 30, 2024.

First Office Action issued in corresponding Japanese application No. 2023-508617, mailed Jun. 11, 2024.

First Office Action issued in corresponding Chinese application No. 202310102555.6, mailed Jun. 20, 2024.

Source: Huawei, Hisilicon, KPN; Title: Key issue on relay discovery and selection enhancement SA WG2 Meeting #118 S2-166358 Nov. 14-18, 2016, Reno, NV, USA.

First Office Action issued in corresponding Russian application No. 2022133050, mailed Jul. 28, 2023.

First Office Action issued in corresponding Vietnamese Application No. 1-2022-08158, dated Sep. 9, 2024, 4 pages.

Notice of Grant of Invention Patent Right issued in corresponding Chinese Application No. 202310102555.6, dated Oct. 1, 2024, 6 pages.

Decision to Grant a Patent issued in corresponding Japanese Application No. 2023-508617, dated Oct. 11, 2024, 6 pages.

Examination report No. 1 for standard patent application issued in corresponding Australian Application No. 2020463022, dated Aug. 21, 2025, 3 pages.

* cited by examiner

RELAY COMMUNICATION METHOD AND DEVICE

CROSS-REFERENCE TO RELATED APPLICATION

This application is a continuation of International Application No. PCT/CN2020/109018, filed Aug. 13, 2020, the entire contents of which are incorporated herein by reference.

TECHNICAL FIELD

Embodiments of the present application relate to the field of communications, and more specifically, to a method and device for relay communication.

BACKGROUND

In the New Radio (NR) system, a remote terminal (remote UE) can establish a direct connection with a relay terminal (relay UE) through a PC5 interface and connect to the network through the relay UE. In addition, in relay communication, the remote terminal needs to select a Public Land Mobile Network (PLMN) and a relay UE to establish a communication connection with the network. However, how to select PLMN and relay UE for the remote UE is an urgent problem to be solved.

SUMMARY

The embodiments of the present application provide a method and device for relay communication, where a remote UE can select a relay device based on the selected PLMN, enabling only different PLMNs with relay protocols to relay services to each other, thereby optimizing relay communication.

In a first aspect, there is provided a method for relay communication, the method including:
 selecting, by a remote device, a target PLMN; and
 selecting, by the remote device, a target relay device based on that target PLMN.

In a second aspect, there is provided a remote device for performing the method in the first aspect described above.

Specifically, the remote device includes a functional module for performing the method in the first aspect described above.

In a third aspect, there is provided a remote device including: a processor and a memory. The memory is configured to store a computer program, and the processor is configured to call and run the computer program stored in the memory to perform the method in the first aspect described above.

In a fourth aspect, there is provided an apparatus for implementing the method in the first aspect described above.

Specifically, the apparatus includes: a processor for calling and running a computer program from a memory, causing a device in which the apparatus is installed to perform the method in the first aspect described above.

In a fifth aspect, there is provided a computer readable storage medium for storing a computer program, the computer program causing the computer to perform the method in the first aspect described above.

In a sixth aspect, there is provided a computer program product including computer program instructions, the computer program instructions causing a computer to perform the method in the first aspect above.

In a seventh aspect, there is provided a computer program that, when it is run on a computer, causes a computer to perform the method in the first aspect described above.

With the above technical solutions, the remote terminal can select a target relay device based on the selected target PLMN, and can realize that only different PLMNs having a relay protocol can relay services to each other, thereby optimizing relay communication.

DETAILED DESCRIPTION

Figure 1:
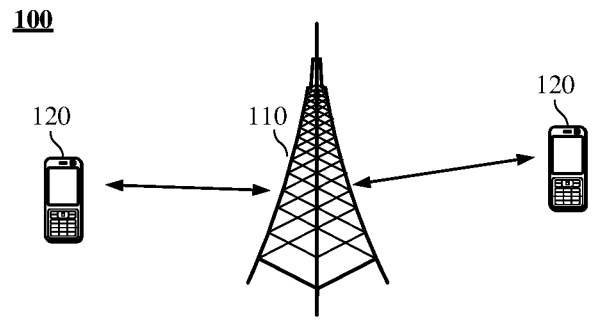
FIG. 1 is a schematic diagram of a communication system architecture applied in the embodiments of the present application.

The technical solutions in the embodiments of the present application will be described below in conjunction with the accompanying drawings in the embodiments of the present application, and it is clear that the embodiments described are a part of the embodiments of the present application, and not all of them. For the embodiments in the present application, all other embodiments obtained by a person of ordinary skill in the art without making creative labor belong to the protection scope of the present application.

The technical solutions of the embodiments of the present application may be applied to various communication systems, such as: a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), a Wireless Local Area Networks (WLAN) system, a Wireless Fidelity (WiFi), a 5th-Generation (5G) system, or other communication systems.

Generally speaking, traditional communication systems support a limited number of connections, which is easy to be implemented. However, with development of communication technologies, the mobile communication systems will support not only traditional communication, but also, for example, Device to Device (D2D) communication, Machine to Machine (M2M) communication, Machine Type Communication (MTC), Vehicle to Vehicle (V2V) communication, or Vehicle to everything (V2X) communication, etc., to which the embodiments of the present application may also be applied.

Optionally, the communication system in the embodiments of the present application may be applied to a Carrier Aggregation (CA) scenario, a Dual Connectivity (DC) scenario, and a Standalone (SA) deployment scenario.

Optionally, the communication system in the embodiments of the present application may be applied to a non-licensed spectrum, where the non-licensed spectrum may also be considered a shared spectrum; or, the communication system in the embodiments of the present application may also be applied to a licensed spectrum, where the licensed spectrum may also be considered a non-shared spectrum.

The embodiments of the present application describe individual embodiments in conjunction with a network device and a terminal device, where the terminal device may also be referred to as a user equipment (UE), an access terminal, a user unit, a user station, a mobile station, a mobile, a remote station, a remote terminal, a mobile device, a user terminal, a terminal, a wireless communication device, a user agent, or a user apparatus.

The terminal device may be a STATION (ST) in the WLAN, and may be a cellular telephone, a cordless telephone, a Session Initiation Protocol (SIP) telephone, a Wireless Local Loop (WLL) station, a Personal Digital Assistant (PDA) device, a handheld device with wireless communication capabilities, a computing device or other processing devices connected to a wireless modem, an in-vehicle device, a wearable device, a terminal device in a next-generation communication system such as an NR network, or a terminal device in a future evolved Public Land Mobile Network (PLMN) network, etc.

In the embodiments of the present application, the terminal device may be deployed on land, including indoor or outdoor, handheld, wearable or vehicle-mounted; or may be deployed on water (e.g., ships, etc.); or may be deployed in the air (e.g., on aircraft, balloons, satellites, etc.).

In the embodiments of the present application, the terminal device may be a Mobile Phone, a tablet computer (Pad), a computer with wireless transceiver function, a Virtual Reality (VR) terminal device, an Augmented Reality (AR) terminal device, a wireless terminal device in the industrial control, a wireless terminal device in self driving, a wireless terminal device in a remote medical, a wireless terminal device in the smart grid, a wireless terminal device in the transportation safety, a wireless terminal device in smart city, or a wireless terminal device in a smart home, etc.

By way of example and not limitation, in the embodiments of the present application, the terminal device may also be a wearable device. The wearable device may also be called a wearable smart device, which is a general term for a device that can be worn by applying wearable technology to intelligently design and develop daily wear, such as glasses, gloves, watches, clothing and shoes. The wearable device is a portable device that is worn directly on the body or integrated into the user's clothing or accessories. The wearable device is not only a hardware device, but also realizes a powerful function through software support as well as data interaction and cloud interaction. Broadly speaking, the wearable smart devices include: devices having full function and large size that can achieve complete or partial functions without relying on smartphones, such as smart watches or smart glasses; and devices that focus only on a certain type of application function and need to be used in conjunction with other devices such as smartphones, such as various types of smart bracelets and smart jewelry for sign monitoring.

In the embodiments of the present application, the network device may be a device for communicating with a mobile device, and the network device may be an Access Point (AP) in WLAN, a Base Transceiver Station (BTS) in GSM or CDMA, or a base station (NodeB, NB) in WCDMA, and may be an Evolutional Node B (eNB or eNodeB) in LTE, or a relay station or access point, or a vehicle-mounted device, a wearable device, and a base station (gNB) in an NR network or a network device in a future evolved PLMN network or a network device in an NTN network, etc.

By way of example and not limitation, in the embodiments of the present application, the network device may have mobile characteristics, for example, the network device may be a mobile device. Optionally, the network device may be a satellite, a balloon station. For example, the satellite may be a low earth orbit (LEO) satellite, a medium earth orbit (MEO) satellite, a geostationary earth orbit (GEO) satellite, a High Elliptical Orbit (HEO) satellite, etc. Optionally, the network device may also be a base station provided on land, water, etc.

In the embodiments of the present application, the network device can provide service to the cell, and the terminal device communicates with the network device through the transmission resources (e.g., frequency domain resources, or spectrum resources) used by the cell. The cell may be a cell corresponding to the network device (e.g., base station), and the cell may belong to the macro base station or may belong to a base station corresponding to the Small cell. The Small cell here may include a Metro cell, a Micro cell, a Pico cell, a Femto cell, etc. These Small cells have the characteristics of small coverage area and low transmit power, and are suitable for providing high speed data transmission services.

Exemplarily, the communication system 100 applied in the embodiments of the present application is shown in FIG. 1. The communication system 100 may include a network device 110, and the network device 110 may be a device that communicates with a terminal device 120 (or referred to as a communication terminal, a terminal). The network device 110 may provide communication coverage for a specific geographic area and may communicate with the terminal device(s) located within that coverage area.

FIG. 1 exemplarily illustrates one network device and two terminal devices. Optionally, the communication system 100 may include a plurality of network devices and other numbers of terminal devices may be included in the coverage area of each network device, which is not limited by the embodiments of the present application.

Optionally, the communication system 100 may also include other network entities such as a network controller, a mobile management entity, etc., which is not limited by the embodiments of the present application.

It should be understood that the devices with communication functions in the network/system in the embodiments of the present application may be referred to as communication devices. Taking the communication system 100 illustrated in FIG. 1 as an example, the communication device may include a network device 110 and terminal devices 120 having communication functions, and the network device 110 and the terminal devices 120 may be specific devices as described above and will not be elaborated herein. The communication device may also include other devices in the communication system 100, such as a network controller, a mobile management entity, and other network entities, which is not limited in the embodiments of the present application.

It should be understood that the terms "system" and "network" are often used interchangeably herein. The term "and/or" in the present disclosure is simply used to describe the association of related objects, indicating that three relationships can exist, e.g., A and/or B may mean the following three conditions: A exists alone, A and B exist at the same time, and B exists alone. In addition, the character "/" in the present disclosure generally indicates that the associated objects before and after have an "or" relationship.

The terms used in the embodiments of the present application are intended only to explain specific embodiments of the present application and are not intended to limit the present application. The terms "first", "second", "third", and "fourth" in the specification and claims of the present application and the accompanying drawings are used to distinguish between different objects and are not intended to describe a particular order. In addition, the terms "include" and "have", and any variations thereof, are intended to cover non-exclusive inclusion.

It should be understood that the reference to "indicate" in the embodiments of the present application may be a direct indication, an indirect indication, or an indication of having an associative relationship. For example, A indicating B may mean that A indicates B directly, e.g., B may be obtained through A; or A indicating B may mean that A indirectly indicates B, e.g., A indicates C, and B may be obtained through C; or A indicating B may mean that A and B may be related to each other.

In the description of the embodiments of the present application, the term "correspond" may indicate a direct correspondence or an indirect correspondence between two objects, or may indicate that there is an association relationship between the two objects, or may indicate a relationship of indicating and being indicated, configuring and being configured, etc.

Figure 2:
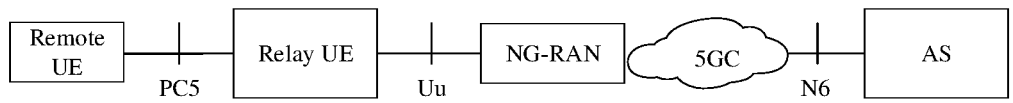
FIG. 2 is a schematic diagram of a relay network architecture provided by the present application.

In the NR system, a terminal device with Proximity-based Services (ProSe) capability can communicate directly with another terminal device with ProSe capability through the PC5 interface. When a terminal device can connect to an external data network through the 5th Generation (5G) network and also has the ProSe capability, this terminal device can act as a relay UE, and another remote UE with the ProSe capability may establish a direct connection with the relay UE through the PC5 interface, and interact with the external network through the Protocol Data Unit (PDU) session established between the relay UE and the 5G network, the system architecture thereof may be shown in FIG. 2. In FIG. 2, the remote UE is connected to the relay UE through the PC5 interface, and the relay UE is connected to the Next Generation Evolutional Radio Access Network (NG-RAN) through the Uu interface, thus connecting to the 5G Core Network (5GC), and the 5GC connects to an application server (AS) via the N6 interface.

It should be noted that FIG. 2 is an example of a 5G communication system, but other 3GPP communication systems can be applied, such as 4G communication systems, or future 3GPP communication systems, which is not limited by the present application. In addition, in the embodiments of the present application, the application server (AS) in FIG. 2 may also be other terminal devices or external public safety Internet.

Figure 3:
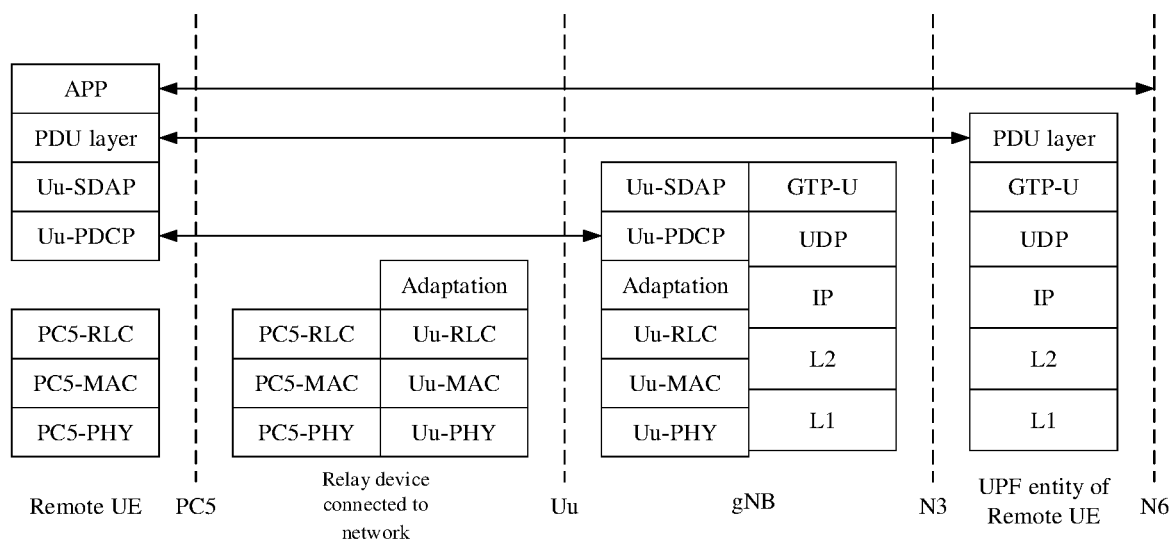
FIG. 3 is a schematic diagram of a user plane transport protocol stack provided by the present application.

In the NR system, a terminal-to-network (UE-to-Network) relay based on Layer 2 is introduced. The UE-to-Network relay may connect directly to the network, and the remote UE is connected to the Access Network (AN) and the Core Network (CN) via a relay device at the end-to-end Packet Data Convergence Protocol (PDCP) layer. FIG. 3 illustrates a user plane transport protocol stack related to a PDU session, specifically involving the remote UE and the UE-to-Network relay in layer 2. The PDU layer corresponds to a PDU carried between the remote UE and the data network (DN) via the PDU session. It should be noted that the two endpoints of the PDCP link are the remote UE and the gNB. The relay function is performed below PDCP. This means that data security is ensured between the remote UE and the gNB without exposing raw data at the remote UE to the UE-to-Network relay. As shown in FIG. 3, the remote UE may specifically include the following layers: an application (APP), a PDU, a Uu-Service Data Adaptation Protocol (SDAP), a Uu-PDCP, a PC5-Radio Link Control (RLC), a PC5-Media Access Control (MAC), and a PC5-Physics (PHY). The UE-to-Network relay may specifically include the following layers: an Adaptation, a PC5-RLC, a PC5-MAC, a PC5-PHY, a Uu-RLC, a Uu-MAC, and a Uu-PHY. The gNB may specifically include the following layers: a Uu-SDAP, a Uu-PDCP, an Adaptation, a Uu-RLC, a Uu-MAC, a Uu-PHY, a GPRS Tunneling Protocol for User Plane (GTP-U), a User Datagram Protocol (UDP), an Internet Protocol (IP), a Layer 2 (L2), and a Layer 1 (L1). The User Plane Function (UPF) entity of the remote UE may specifically include the following layers: a PDU layer, a GTP-U, a UDP, an IP, an L2, and an L1.

It should be noted that in FIG. 3 above, the UE-to-Network relay and the adaptation layer in the gNB may differentiate Signaling Radio Bearers (SRB) and Data Radio Bearers (DRB) for a particular remote UE. The adaptation layer is also responsible for mapping PC5 services (PC5 traffic) to one or more DRBs of the Uu.

Figure 4:
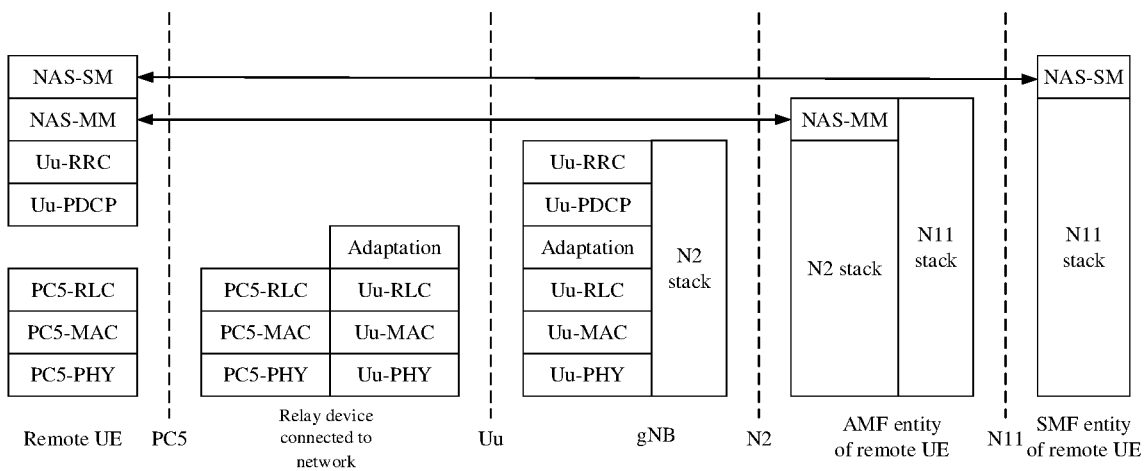
FIG. 4 is a schematic diagram of another user plane transport protocol stack provided by the present application.

FIG. 4 illustrates the protocol stack of the Non-Access Stratum (NAS) connection for the remote UE to the Non-Access Stratum mobile management (NAS-MM) and Non-Access Stratum session management (NAS-SM) components. The NAS messages are transparently transferred between the remote UE and the gNB over the UE-to-Network relay of layer 2. In the PDCP end-to-end connection, the role of the UE-to-Network relay is to relay the PDUs over the signaling radio bear without any modifications. The gNB and the Access and Mobility Management Function (AMF) entity are connected to each other over the N2 interface. The AMF entity and the Session Management Function (SMF) entity are connected over the N11 interface. The role of UE-to-Network relay is to relay the PDUs from the signaling radio bearer without any modifications.

In order to enable a (remote) UE out of coverage to gain connectivity to the network, it is important to allow such UE by means of (pre)configuration to discover a potential UE-to-Network relay UE(s) through which it could gain access to the 5G network. In this way, the parameters for UE-to-network relay UE discovery and for communication over NR PC5 may be provided to the remote UE as follows:
pre-configured in the ME and/or configured in the Universal Integrated Circuit Card (UICC);

provided or updated by the Policy Control function (PCF) entity into the terminal device in the serving PLMN.

The Home Public Land Mobile Network (HPLMN) PCF entity is able to provide authorization for the terminal device to operate as a remote UE or as a UE-to-Network relay UE on a per PLMN basis. The serving PLMN is also able to provide/revoke such authorization, in which case it shall override any corresponding information provided by the HPLMN.

Figure 5:
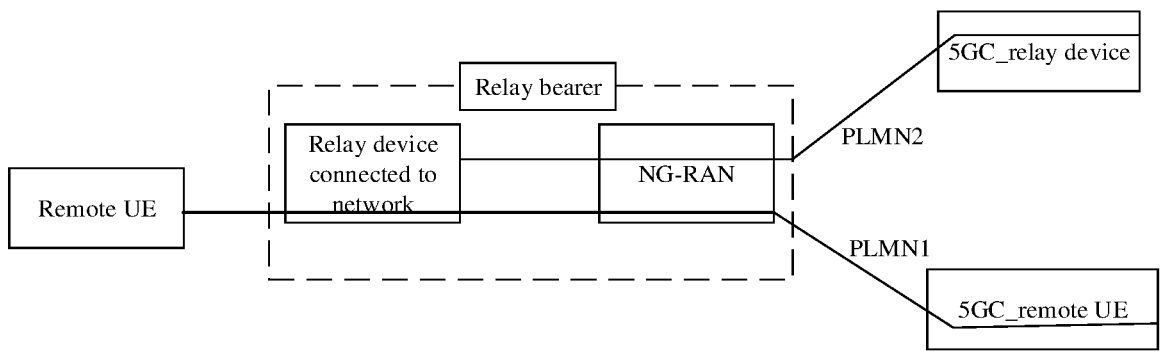
FIG. 5 is a schematic diagram of a remote UE and a relay UE from different PLMNs provided by the present application.

When Radio Access Network (RAN) sharing is deployed, the remote UE and the relay UE are from different PLMNs. As shown in FIG. 5 below, the remote UE is from PLMN1 and the relay UE is from PLMN2. In order to implement Layer 2 relay, the UE-to-Network relay UE needs to initiate a service request procedure and establish relay bearer on Uu interface. This will consume CN resource and potential resources of the relay (resources should be confirmed as RAN2). The relay UE may determine whether it can forward the remote's traffic according to the inter-PLMN agreements.

Meanwhile, for Layer 2 based relay, the remote UE-NAS layer will perform PLMN selection as usual and candidate PLMN for PLMN selection should be authorized for performing Layer 2 based UE-to-Network relay terminal.

In addition, there is a cross-issue between relay selection and PLMN selection.

In a normal PLMN via Uu interface, the terminal device shall scan all radio frequency (RF) channels in the bands according to its capabilities to find available PLMNs. The terminal device reads its system information, in order to find out which PLMN(s) the cell belongs to. And then the NAS layer performs PLMN selection, and the Access Stratum (AS) layer performs cell selection on the selected PLMN.

When Layer 2-based relay is introduced, if the serving PLMN of the discovered candidate relay is not authorized to the PLMN for relay, the remote UE will not treat this PLMN and the other PLMNs supported by the cell on which the candidate relay camps as available PLMN for PLMN selection. This means that only PLMNs authorized for relay will be considered for PLMN selection.

Based on the above problems, the present application proposes a scheme for relay communication, where the remote UE can select a relay UE based on the PLMN, thereby improving the accuracy of relay UE and PLMN selection.

The technical solutions of the present application are detailed below by specific embodiments.

Figure 6:
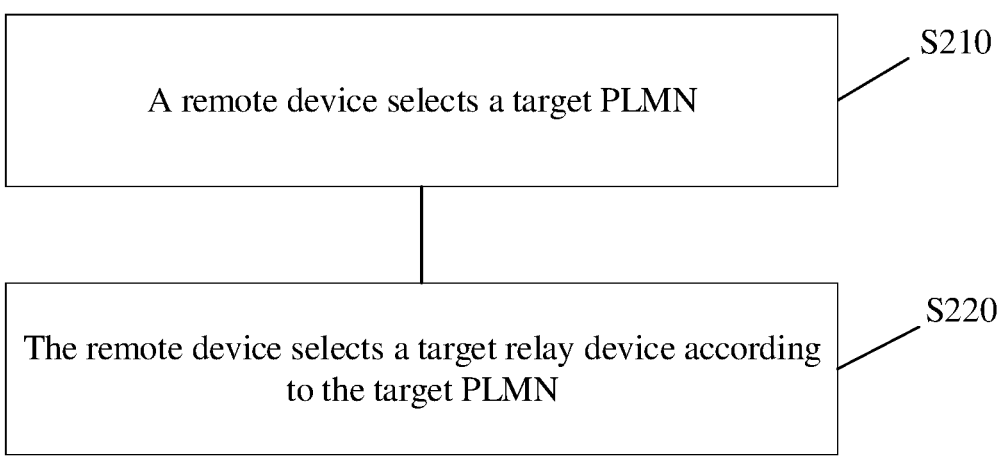
FIG. 6 is a schematic flowchart of a method for relay communication according to the embodiments of the present application.

FIG. 6 is a schematic flowchart of a method 200 for relay communication according to an embodiment of the present application, which, as shown in FIG. 6, may include at least some of the following contents.

In S210, the remote device selects a target PLMN.

In S220, the remote device selects a target relay device based on the target PLMN.

In the embodiments of the present application, the remote device may be a remote terminal (remote UE), the target relay device may be a relay terminal (relay UE), and the remote device and the target relay device may communicate with each other via a PC5 interface.

Optionally, the target relay device may be directly connected to a network, i.e. the target relay device may be a terminal-to-network (UE-to-Network) relay device.

Optionally, the remote device may achieve relay communication with the target relay device via the target PLMN.

Optionally, in the embodiments of the present application, the above S210 may be performed by the NAS layer of the remote device, specifically, the NAS layer of the remote device selects the target PLMN. The above S220 may be performed by Proximity-based Services (ProSe) layer of the remote device, specially, the ProSe layer of the remote device selects the target relay device based on the target PLMN selected by the NAS layer of the remote device.

Optionally, in some embodiments, the above S210 may specifically be:

the NAS layer of the remote device obtaining at least one PLMN available for selection from the ProSe layer of the remote device, and the NAS layer of the remote device selecting the target PLMN from the at least one PLMN.

For example, the ProSe layer of the remote device, after obtaining the at least one PLMN available for selection, actively provides the at least one PLMN to the NAS layer of the remote device.

For another example, the ProSe layer of the remote device, after obtaining the at least one PLMN available for selection, provides the at least one PLMN to the NAS layer of the remote device based on a request of the NAS layer of the remote device.

It is to be noted that if the ProSe layer of the remote device does not determine the selectable PLMN, the ProSe layer of the remote device does not provide the PLMN to the NAS layer of the remote device, i.e., the NAS layer of the remote device cannot elect the target PLMN.

Optionally, further, the ProSe layer of the remote device may determine the at least one PLMN by a first example or a second example as follows.

In the first example, the ProSe layer of the remote device determines the at least one PLMN based on a serving PLMN of one or more relay devices, PLMNs of cells of the one or more relay devices, and an authorized PLMN of the remote device.

Specifically, in the first example, the ProSe layer of the remote device determines at least one of the one or more relay devices, the serving PLMN of the at least one relay device belonging to the authorized PLMN of the remote device; and the ProSe layer of the remote device determines a PLMN in the PLMNs of the cell of the at least one relay device that belongs to the authorized PLMN of the remote device, as the at least one PLMN.

Optionally, in the first example, the authorized PLMN of the remote device is indicated or configured by a PCF entity. For example, the remote device receives the authorized PLMN information sent by the PCF entity, and the authorized PLMN information is used to indicate the authorized PLMN of the remote device. In addition, the PLMN indicated by the authorized PLMN information may include one or more relay PLMNs. Alternatively, the PLMN indicated by the authorized PLMN information may include one or more PLMNs with relay protocols.

For example, the PCF entity indicates by the authorized PLMN information that PLMN 1, 2, 3, 4, 5, 7, 8 are authorized for relay and PLMN6 is not authorized for relay.

Optionally, in the first example, the ProSe layer of the remote device obtains first information sent by the one or more relay devices, respectively, the first information including a serving PLMN of a corresponding relay device.

Optionally, the first information is discovery announce information or discovery response information.

That is, the remote device may obtain the serving PLMN of the corresponding relay device in the process of discovering the relay device.

For example, the remote device receives discovery announce information 1 sent by relay device 1, the discovery announce information 1 including a serving PLMN1 of relay device 1; and the remote device receives discovery announce information 2 sent by relay device 2, the discovery announce information 2 including a serving PLMN2 of relay device 2.

Optionally, in the first example, the ProSe layer of the remote device obtains second information sent by the one or more relay devices, respectively, the second information including PLMNs of the cell of the corresponding relay device.

Optionally, the second information may be System Information (SI).

That is, the remote device may obtain the PLMN of the cell of the corresponding relay device in the cell SI forwarded by the relay device.

For example, relay device 1 obtains SI from the system information of its cell, and the SI includes the PLMN of the cell of this relay device 1. This relay device 1 forwards this SI to the remote device, and thus the remote device obtains the PLMN of the cell of relay device 1.

In the second example, the ProSe layer of the remote device determines the at least one PLMN based on the serving PLMN of one or more relay devices, and the authorized PLMN of the remote device.

Specifically, in the second example, the ProSe layer of the remote device determines at least one relay device of the one or more relay devices, the serving PLMN of the at least one relay device belonging to the authorized PLMN of the remote device; and the ProSe layer of the remote device determines the serving PLMN of the at least one relay device as the at least one PLMN.

Optionally, in the second example, the authorized PLMN of the remote device is indicated or configured by the PCF entity. For example, the remote device receives authorized PLMN information sent by the PCF entity, and the authorized PLMN information is used to indicate the authorized PLMN of the remote device. In addition, the PLMN indicated by the authorized PLMN information may include one or more relay PLMNs. Alternatively, the PLMN indicated by the authorized PLMN information may include one or more PLMNs with a relay protocol.

For example, the PCF entity indicates by the authorized PLMN information that PLMNs 1, 2, 3, 4, 5, 7, 8 are authorized for relay and PLMN 6 is not authorized for relay.

Optionally, in the second example, the ProSe layer of the remote device obtains first information sent by the one or more relay devices, respectively, the first information including a serving PLMN of the corresponding relay device.

Optionally, the first information is discovery announce information or discovery response information.

That is, the remote device may obtain the serving PLMN of the corresponding relay device in the process of discovering the relay device.

For example, the remote device receives discovery announce information 1 sent by relay device 1, the discovery announce information 1 including a serving PLMN1 of relay device 1; and the remote device receives discovery announce information 2 sent by relay device 2, the discovery announce information including a serving PLMN2 of relay device 2.

It is noted that in the above first and second examples, the one or more relay devices are the relay devices discovered by this remote device via Model A or Model B. In Model A, the remote device discovers the relay device based on the received discovery announce information sent by the relay device; in Model B, the remote device sends discovery information, the relay device receives the discovery information and feeds discovery response information to the remote device, and the remote device may discover the relay device based on the received discovery response information. That is, in the above first and second examples, the first information may be the discovery announce information in Model A, and the first information may also be the discovery response information in Model B.

Optionally, in some embodiments, the above S220 may specially be:
the ProSe layer of the remote device obtaining the target PLMN from the NAS layer of the remote device; and the ProSe layer of the remote device selecting a target relay device based on the target PLMN.

For example, the NAS layer of the remote device, after selecting the target PLMN, actively provides the target PLMN to the ProSe layer of the remote device.

For another example, the NAS layer of the remote device, after selecting the target PLMN, provides the target PLMN to the ProSe layer of the remote device based on a request of the ProSe layer of the remote device.

Further, the above S220 may specifically be:
the ProSe layer of the remote device determining a first relay device of the one or more relay devices as the target relay device, where the PLMN of the cell of the first relay device includes the target PLMN.

Optionally, the ProSe layer of the remote device obtains second information sent by the one or more relay devices, respectively, the second information including PLMNs of the cell of the corresponding relay device.

Optionally, the second information may be System Information (SI).

That is, the remote device may obtain the PLMN of the cell of the corresponding relay device in the cell SI forwarded by the relay device.

Therefore, in the embodiments of the present application, the remote UE can select the target relay device based on the selected target PLMN, and can realize that only different PLMNs with relay protocols can relay services to each other, thus optimizing relay communication.

The relay communication method 200 described in the present application is described in detail by a first embodiment and a second embodiment below.

Figure 7:
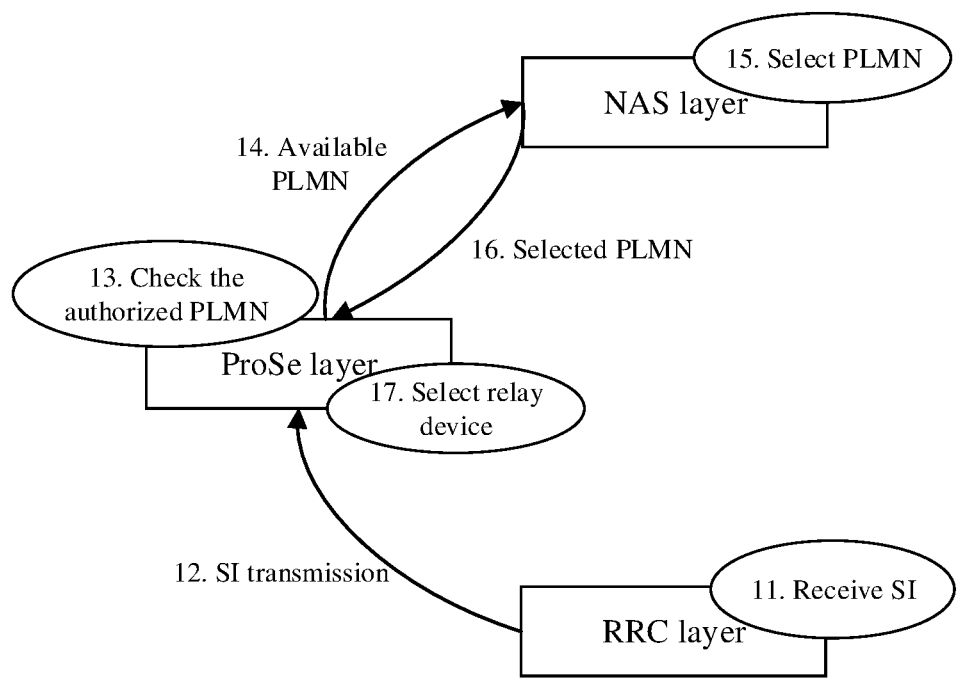
FIG. 7 is a schematic flowchart of selecting a target PLMN and a target relay device according to the embodiments of the present application.

In the first embodiment, as shown in FIG. 7, a remote UE may select a target PLMN and a target relay device through steps 11 to 17, and the remote UE may realize relay communication with the target relay device based on the target PLMN. In addition, the target relay device is directly connected to a network device, i.e., the target relay device may be a UE-to-Network relay device. It should be noted that the remote UE, prior to performing step 11, has discovered relay device 1, relay device 2, and relay device 3 by Model A or Model B, and is informed that the serving PLMN of relay device 1 is PLMN 1, the serving PLMN of relay device 2 is PLMN 6, and the serving PLMN of relay device 3 is PLMN 5. In addition, the PLMNs of the remote UE authorized by the PCF entity include PLMNs 1, 2, 3, 4, 5, 7, 8, i.e., PLMNs 1, 2, 3, 4, 5, 7, 8 may be used for relay, while PLMN 6 cannot be used for relay.

The specific flow of the first embodiment is as follows.

11. The Radio Resource Control (RRC) layer of the remote UE receives SI information 1 sent by relay device 1, SI information 2 sent by relay device 2, and SI information 3 sent by relay device 3, respectively.

Among them, SI information 1 includes PLMNs 1, 2, 3, 4, i.e., PLMNs 1, 2, 3, 4 are the PLMNs of the cell of relay device 1; SI information 2 includes PLMNs 5, 6, 7, 8, i.e., PLMNs 5, 6, 7, 8 are the PLMNs of the cell of relay device 2; SI information 3 includes PLMNs 3, 4, 5, 6, i.e., PLMNs 3, 4, 5, 6 are the PLMNs of the cell of relay device 3.

In the first embodiment, the specific PLMN information may be as shown in Table 1.

TABLE 1

| Relay device | Serving PLMN | PLMN of Cell |
|---|---|---|
| Relay device 1 | PLMN 1 | PLMN 1, 2, 3, 4 |
| Relay device 2 | PLMN 6 | PLMN 5, 6, 7, 8 |
| Relay device 3 | PLMN 5 | PLMN 3, 4, 5, 6 |

12. The RRC layer of the remote UE forwards the received SI information 1, SI information 2 and SI information 3 to the ProSe layer of the remote UE.

13. The ProSe layer of the remote UE determines PLMNs available for selection.

First, the ProSe layer of the remote UE checks the PLMN information of each relay device, the serving PLMN of relay device 1 (PLMN 1) is an authorized PLMN, the serving PLMN of relay device 2 (PLMN 6) is an unauthorized PLMN, and the serving PLMN of relay device 3 (PLMN 5) is an authorized PLMN, and the ProSe layer of the remote UE selects relay device 1 and relay device 3 from the three relay devices (since the serving PLMNs of relay device 1 and relay device 3 are authorized PLMNs); then, the authorized PLMNs, i.e., PLMNs 1, 2, 3, 4 are selected among the PLMNs of the cell of relay device 1, and the authorized PLMNs, i.e., PLMNs 3, 4, 5, are selected among the PLMNs of the cell of relay device 3; finally, the ProSe layer of the remote UE takes PLMNs 1, 2, 3, 4, 5 as the PLMNs available for selection.

14. The ProSe layer of the remote UE provides PLMNs 1, 2, 3, 4, 5 as PLMNs available for selection to the NAS layer of the remote UE.

15. The NAS layer of the remote UE selects PLMN 2 from PLMN 1, 2, 3, 4, 5 as the target PLMN.

16. The NAS layer of the remote UE provides PLMN 2 as the target PLMN to the ProSe layer of the remote UE.

17. The ProSe layer of the remote UE determines relay device 1 as the target relay device based on PLMN 2 (since PLMN 2 is included in the PLMN of cell of relay device 1).

Figure 8:
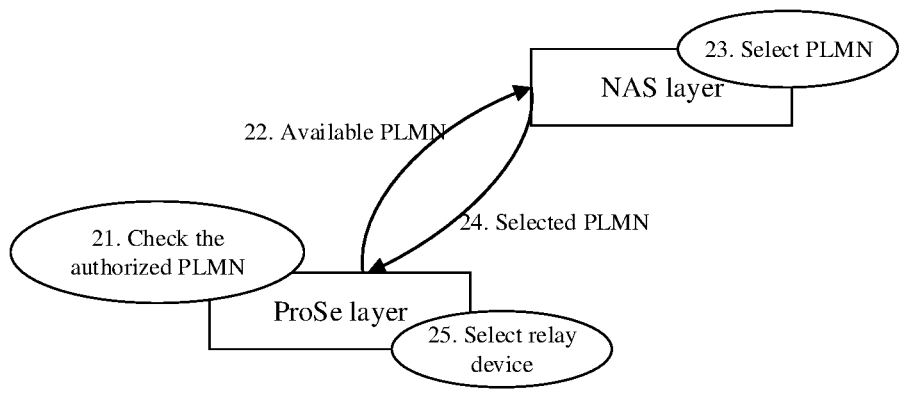
FIG. 8 is another schematic flowchart of selecting a target PLMN and a target relay device according to the embodiments of the present application.

In the second embodiment, as shown in FIG. 8, the remote UE may select a target PLMN and a target relay device by steps 21 to 25, and the remote UE may realize relay communication with the target relay device based on the target PLMN. In addition, the target relay device is directly connected to a network device, i.e., the target relay device may be a UE-to-Network relay device. It should be noted that the remote UE, prior to performing step 21, has discovered relay device 1, relay device 2, and relay device 3 by Model A or Model B, and is informed that the serving PLMN of relay device 1 is PLMN 1, the serving PLMN of relay device 2 is PLMN 6, and the serving PLMN of relay device 3 is PLMN 5. In addition, the PLMNs of the remote UE authorized by the PCF entity include PLMNs 1, 2, 3, 4, 5, 7, 8, i.e., PLMNs 1, 2, 3, 4, 5, 7, 8 may be used for relay, while PLMN 6 cannot be used for relay.

The specific flow of the second embodiment is as follows.

In the second embodiment, the specific PLMN information may be shown in Table 2.

TABLE 2

| Relay device | Serving PLMN |
|---|---|
| Relay device 1 | PLMN 1 |

TABLE 2-continued

| Relay device | Serving PLMN |
|---|---|
| Relay device 2 | PLMN 6 |
| Relay device 3 | PLMN 5 |

21. The ProSe layer of the remote UE determines the PLMNs available for selection.

First, the ProSe layer of the remote UE checks PLMN information of each relay device, the serving PLMN of relay device 1 (PLMN 1) is an authorized PLMN, the serving PLMN of relay device 2 (PLMN 6) is an unauthorized PLMN, and the serving PLMN of relay device 3 (PLMN 5) is an authorized PLMN, and the ProSe layer of the remote UE selects relay device 1 and relay device 3 from the three relay devices (since the serving PLMNs of relay device 1 and relay device 3 are authorized PLMNs); then, the ProSe layer of the remote UE takes PLMN 1 and PLMN 5 as the PLMNs available for selection.

22. The ProSe layer of the remote UE provides PLMN 1 and PLMN 5 as PLMNs available for selection to the NAS layer of the remote UE.

23. The NAS layer of the remote UE selects PLMN 5 from PLMN 1 and PLMN 5 as the target PLMN.

24. The NAS layer of the remote UE provides PLMN 5 as the target PLMN to the ProSe layer of the remote UE.

25. The ProSe layer of the remote UE determines relay device 2 as the target relay device based on PLMN 5 (since PLMN 5 is included in the PLMN of the cell of relay device 2).

It should be noted that the RRC layer of the remote UE may receive SI information 1 sent by relay device 1, SI information 2 sent by relay device 2, and SI information 3 sent by relay device 3, respectively. SI information 1 includes PLMNs 1, 2, 3, 4, i.e., PLMNs 1, 2, 3, 4 are the PLMNs of the cell of relay device 1; SI information 2 includes PLMNs 5, 6, 7, 8, i.e., PLMNs 5, 6, 7, 8 are the PLMNs of the cell of relay device 2; SI information 3 includes PLMNs 3, 4, 5, 6, i.e., PLMNs 3, 4, 5, 6 are the PLMNs of the cell of relay device 3.

The method embodiments of the present application are described in detail above in connection with FIGS. 6 to 8, and apparatus embodiments of the present application is described in detail below in connection with FIGS. 9 to 12. It should be understood that the apparatus embodiments and the method embodiments correspond to each other, and similar descriptions may be referred to the method embodiments.

Figure 9:
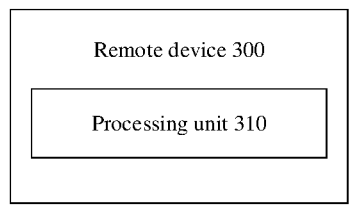
FIG. 9 is a schematic block diagram of a remote device according to the embodiments of the present application.

FIG. 9 illustrates a schematic block diagram of a remote device 300 according to an embodiment of the present application. As shown in FIG. 9, the remote device 300 includes:

a processing unit 310, configured to select a target public land mobile network (PLMN); and the processing unit 310 is further configured to select a target relay device based on the target PLMN.

Optionally, the processing unit 310 is specifically configured to:

control a non-access layer (NAS) layer of the remote device to obtain at least one PLMN available for selection from a proximity-based services (ProSe) layer of the remote device, and control the NAS layer of the remote device to select the target PLMN from the at least one PLMN.

Optionally, the processing unit 310 is further configured to:

control the ProSe layer of the remote device to determine the at least one PLMN based on a serving PLMN of one or more relay devices, PLMNs of a cell of the one or more relay devices, and an authorized PLMN of the remote device.

Optionally, the processing unit 310 is specifically configured to:

control the ProSe layer of the remote device to determine at least one relay device in the one or more relay devices, a serving PLMN of the at least one relay device belonging to the authorized PLMN of the remote device; and control the ProSe layer of the remote device to determine a PLMN in the PLMNs of the cell of the at least one relay device that belongs to the authorized PLMN of the remote device, as the at least one PLMN.

Optionally, the processing unit 310 is further configured to control the ProSe layer of the remote device to determine the at least one PLMN based on the serving PLMN of one or more relay devices, and the authorized PLMN of the remote device.

Optionally, the processing unit 310 is specifically configured to:

control the ProSe layer of the remote device to determine at least one relay device in the one or more relay devices, the serving PLMN of the at least one relay device belonging to the authorized PLMN of the remote device; and control the ProSe layer of the remote device to determine the serving PLMN of the at least one relay device as the at least one PLMN.

Optionally, the processing unit 310 is further configured to control the ProSe layer of the remote device to obtain first information sent by the one or more relay devices, respectively, the first information including serving PLMNs of the corresponding relay device.

Optionally, the first information is discovery announce information or discovery response information.

Optionally, the authorized PLMN of the remote device is indicated or configured by a policy control function (PCF) entity.

Optionally, the processing unit 310 is specifically configured to:

control the ProSe layer of the remote device to obtain the target PLMN from the NAS layer of the remote device; and control the ProSe layer of the remote device to select a target relay device based on the target PLMN.

Optionally, the processing unit 310 is specifically configured to:

control the ProSe layer of the remote device to determine a first relay device of the one or more relay devices as the target relay device, where the PLMN of the cell of the first relay device includes the target PLMN.

Optionally, the processing unit 310 is further configured to control the ProSe layer of the remote device to obtain second information sent by the one or more relay devices, respectively, the second information including PLMNs of the cell of the corresponding relay device.

Optionally, the second information is system information (SI).

Optionally, in some embodiments, the above communication unit may be a communication interface or a transceiver, or an input-output interface of a communication chip or a system-on-chip. The above processing unit may be one or more processors.

It should be understood that the remote device 300 according to the embodiments of the present application may correspond to the terminal device in the method embodiments of the present application, and the above and other operations and/or functions of the individual units in the remote device 300 are respectively intended to implement the corresponding processes of the remote UE in the method 200 shown in FIG. 6, and are not repeated herein for brevity.

Figure 10:
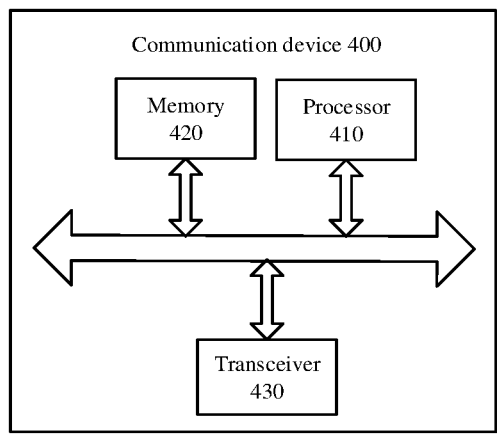
FIG. 10 is a schematic block diagram of a communication device according to the embodiments of the present application.

FIG. 10 is a schematic structure diagram of a communication device 400 provided by an embodiment of the present application. The communication device 400 shown in FIG. 10 includes a processor 410 that may call and run a computer program from a memory to implement the method in the embodiments of the present application.

Optionally, as shown in FIG. 10, the communication device 400 may also include a memory 420. The processor 410 may call and run the computer program from the memory 420 to implement the method in the embodiments of the present application.

The memory 420 may be a separate device from the processor 410 or may be integrated into the processor 410.

Optionally, as shown in FIG. 10, the communication device 400 may also include a transceiver 430. The processor 410 may control the transceiver 430 to communicate with other devices, specifically, to send information or data to, or receive information or data from, other devices.

The transceiver 430 may include a transmitter and a receiver. The transceiver 430 may further include an antenna, and the number of antennas may be one or more.

Optionally, the communication device 400 may specifically be the remote UE of the embodiments of the present application, and the communication device 400 may implement the corresponding processes implemented by the remote UE in each of the methods of the embodiments of the present application, which will not be repeated herein for the sake of brevity.

Figure 11:
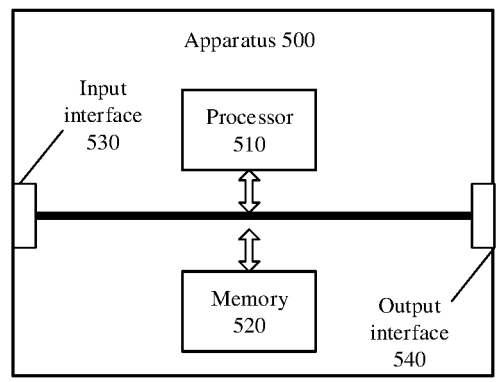
FIG. 11 is a schematic block diagram of an apparatus according to the embodiments of the present application.

FIG. 11 is a schematic structural diagram of an apparatus according to an embodiment of the present application. The apparatus 500 shown in FIG. 11 includes a processor 510, and the processor 510 may call and run a computer program from a memory to implement the method in the embodiments of the present application.

Optionally, as shown in FIG. 11, the apparatus 500 may also include a memory 520. The processor 510 may call and run the computer program from the memory 520 to implement the method in the embodiments of the present application.

The memory 520 may be a separate device from the processor 510 or may be integrated in the processor 510.

Optionally, the apparatus 500 may also include an input interface 530, where the processor 510 may control the input interface 530 to communicate with other devices or chips, specifically, to obtain information or data sent by other devices or chips.

Optionally, the apparatus 500 may also include an output interface 540, where the processor 510 may control the output interface 540 to communicate with other devices or chips, specifically, to output information or data to other devices or chips.

Optionally, the apparatus may be applied to the remote UE in the embodiments of the present application, and the apparatus may implement the corresponding processes implemented by the remote UE in each of the methods of the embodiments of the present application, which will not be repeated herein for the sake of brevity.

Optionally, the apparatus mentioned in the embodiments of the present application may also be a chip. For example, it may be a system level chip, a system chip, a chip system or a system-on-chip, etc.

Figure 12:
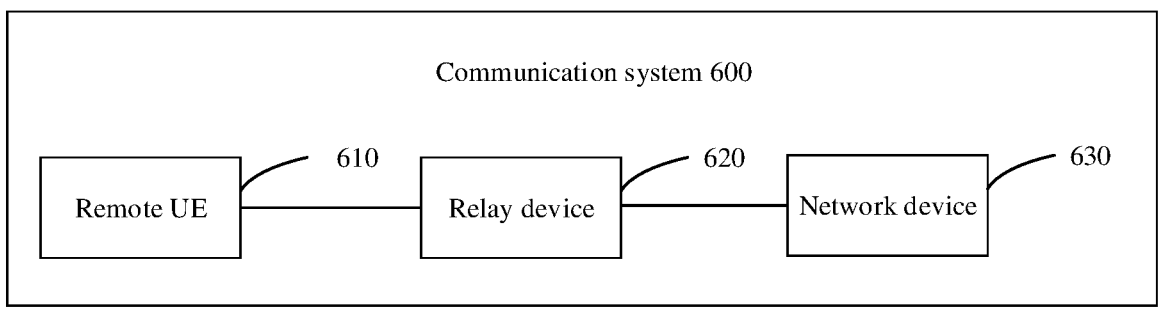
FIG. 12 is a schematic block diagram of a communication system according to the embodiments of the present application.

FIG. 12 is a schematic block diagram of a communication system 600 provided by an embodiment of the present application. As shown in FIG. 12, the communication system 600 includes a remote UE 610, a relay device 620, and a network device 630.

The remote UE 610 may be configured to implement the corresponding functions implemented by the remote UE in the methods described above, which will not be repeated herein for the sake of brevity.

It should be understood that the processor of the embodiments of the present application may be an integrated circuit chip having the processing capability of signals. During implementation, the steps of the above method embodiments may be accomplished by integrated logic circuitry in the hardware or by instructions in the form of software in the processor. The above processor may be a general purpose processor, a Digital Signal Processor (DSP), an Application Specific Integrated Circuit (ASIC), a Field Programmable Gate Array (FPGA) or other programmable logic device, a discrete gate or a transistor logic device, or a discrete hardware component. The methods, steps, and logical block diagrams of the disclosure in the embodiments of the present application may be implemented or performed. The general purpose processor may be a microprocessor or the processor may also be any conventional processor, etc. The steps of the method disclosed in combination with the embodiments of the present application may be directly embodied as performed by the hardware decode processor or performed with a combination of hardware and software modules in the decode processor. The software module may be located in a random memory, a flash memory, a read-only memory, a programmable read-only memory or an electrically erasable programmable memory, a register, and other mature storage media in the art. The storage medium is located in the memory and the processor reads the information in the memory and completes the steps of the above methods in combination with its hardware.

It is understood that the memory in the embodiments of the present application may be a volatile memory or a non-volatile memory, or may include both the volatile and non-volatile memories. Among them, the non-volatile memory may be a Read-Only Memory (ROM), a Programmable ROM (PROM), an Erasable Programmable Read-Only Memory (EPROM), an Electrically Erasable Programmable Read-Only Memory (EPROM), an Electrically EPROM (EEPROM), or a flash memory. The volatile memory may be a Random Access Memory (RAM), which is used as an external cache. By way of illustration, but not limitation, many forms of RAM are available, such as a Static RAM (SRAM), a Dynamic RAM (DRAM), a Synchronous DRAM (SDRAM), a Double Data Rate Synchronous Random Access memory (Double Data Rate SDRAM, DDR SDRAM), an Enhanced SDRAM (ESDRAM), a Synchlink DRAM (SLDRAM), and a Direct Memory Bus Random Access Memory (Direct Rambus RAM, DR RAM). It should be noted that the memories of the systems and methods described herein are intended to include, but are not limited to, these and any other suitable types of memories.

It should be understood that the above memories are exemplary but not limiting descriptions, for example, the memories in the embodiments of the present application may also be a static random access memory (static RAM, SRAM), a dynamic random access memory (dynamic RAM, DRAM), a synchronous DRAM (SDRAM), a double data rate SDRAM (DDR SDRAM), an enhanced SDRAM (ES-DRAM), a synch link DRAM (SLDRAM), a Direct Rambus RAM (DR RAM), and so on. That is, the memories in the embodiments of the present application are intended to include, but are not limited to, these and any other suitable types of memories.

The embodiments of the present application also provide a computer-readable storage medium for storing a computer program.

Optionally, the computer readable storage medium may be applied to the remote UE in the embodiments of the present application, and the computer program causes the computer to perform the corresponding processes implemented by the remote UE in each of the methods of the embodiments of the present application, which will not be described herein for brevity.

The embodiments of the present application also provide a computer program product including computer program instructions.

Optionally, the computer program product may be applied to the remote UE of the embodiments of the present application, and the computer program instructions cause the computer to perform the corresponding processes implemented by the remote UE in each of the methods of the embodiments of the present application, which will not be repeated herein for brevity.

The embodiments of the present application also provide a computer program.

Optionally, the computer program may be applied to the remote UE in the embodiments of the present application, and when the computer program is run on the computer, it causes the computer to perform the corresponding processes implemented by the remote UE in each of the methods of the embodiments of the present application, which will not be described herein for the sake of brevity.

A person of ordinary skill in the art may realize that the units and algorithmic steps of each example described in conjunction with the embodiments disclosed herein are capable of being implemented with electronic hardware, or a combination of computer software and electronic hardware. Whether these functions are performed in hardware or software depends on the particular application and design constraints of the technical solution. The professional technicians may use different methods to implement the described functions for each particular application, but such implementation should not be considered outside the scope of the present application.

It will be clear to those skilled in the field that, for the convenience and brevity of the description, the specific working processes of the systems, apparatuses and units described above may be referred to the corresponding processes in the preceding method embodiments and will not be repeated here.

In several embodiments provided in the present application, it should be understood that the disclosed systems, apparatuses, and methods may be implemented in other ways. For example, the apparatus embodiments described above are merely schematic, for instance, the division of the units is only a logical functional division, and there may be other division manner in actual implementation, for example, a plurality of units or components may be combined or may be integrated into another system, or some features may be ignored, or not implemented. On another point, the mutual coupling or direct coupling or communication connections shown or discussed may be indirect coupling or communication connections through some interface, apparatus or unit, which may be electrical, mechanical or other forms.

The units illustrated as separate components may or may not be physically separated, and the components shown as units may or may not be physical units, i.e., they may be located in one place or may be distributed to a plurality of network units. Some or all of these units may be selected according to practical needs to achieve the purpose of the present embodiment.

In addition, each functional unit in each embodiment of the present application may be integrated in one processing unit, or each unit may be physically present separately, or two or more units may be integrated in one unit.

The functions may be stored in a computer readable storage medium if implemented as a software functional unit and sold or used as a separate product. It is understood that the technical solution of the present application, or the part of the technical solution that essentially contributes to the prior art, may be embodied in the form of a software product that is stored in a storage medium and includes a number of instructions to cause a computer device (which may be a personal computer, a server, or a network device, etc.) to perform all or some of the steps of the method described in various embodiments of the present application. The aforementioned storage media include: a USB disk, a removable hard disk, a Read-Only Memory (ROM), a Random Access Memory (RAM), a disk or an optical disk, and other media that can store program code.

The above mentioned is only specific implementations of the present application, but the scope of protection of the present application is not limited to this, and any person skilled in the art can easily think of variations or substitutions within the technical scope disclosed in the present application, which should be covered by the scope of protection of the present application. Therefore, the scope of protection of the present application shall be stated to be subject to the scope of protection of the claims.

What is claimed is:

1. A method for relay communication, comprising:
   selecting, by a remote device, a target public land mobile network (PLMN); and
   selecting, by the remote device, a target relay device based on the target PLMN;
   wherein the selecting, by the remote device, the target PLMN, comprising:
   obtaining, by a non-access layer (NAS layer) of the remote device, at least one PLMN available for selection from a proximity-based services (ProSe) layer of the remote device, and selecting, by the NAS layer of the remote device, the target PLMN from the at least one PLMN.

2. The method according to claim 1, wherein the method further comprises:
   determining, by the ProSe layer of the remote device, the at least one PLMN based on serving PLMNs of one or more relay devices, PLMNs of a cell of the one or more relay devices, and at least one authorized PLMN of the remote device.

3. The method according to claim 2, wherein the determining, by the ProSe layer of the remote device, the at least one PLMN based on the serving PLMNs of one or more relay devices, the PLMNs of the cell of the one or more relay devices, and the at least one authorized PLMN of the remote device, comprises:
   determining, by the ProSe layer of the remote device, at least one relay device of the one or more relay devices, wherein a serving PLMN of the at least one relay device belongs to the at least one authorized PLMN of the remote device; and
   determining, by the ProSe layer of the remote device, a PLMN in the PLMNs of the cell of the at least one relay device that belongs to the at least one authorized PLMN of the remote device, as the at least one PLMN.

4. The method according to claim 2, wherein the method further comprises:
   obtaining, by the ProSe layer of the remote device, first information sent by the one or more relay devices, respectively, wherein the first information comprises a serving PLMN of a corresponding relay device.

5. The method according to claim 4, wherein the first information is discovery announce information or discovery response information.

6. The method according to claim 2, wherein the at least one authorized PLMN of the remote device is indicated or configured by a policy control function (PCF) entity.

7. The method according to claim 1, wherein the selecting, by the remote device, the target relay device based on the target PLMN, comprises:
   obtaining, by the ProSe layer of the remote device, the target PLMN from the NAS layer of the remote device; and
   selecting, by the ProSe layer of the remote device, the target relay device based on the target PLMN.

8. The method according to claim 7, wherein the selecting, by the ProSe layer of the remote device, the target relay device based on the target PLMN, comprises:
   determining, by the ProSe layer of the remote device, a first relay device of one or more relay devices as the target relay device, wherein a PLMN of a cell of the first relay device comprises the target PLMN.

9. A remote device, comprising:
   a processor and a memory for storing a computer program, wherein the processor is configured to call and run the computer program stored in the memory, to:
   select a target public land mobile network (PLMN); and
   wherein the processor is further configured to select a target relay device based on the target PLMN;
   wherein the processor is further configured to:
   control a non-access layer (NAS layer) of the remote device to obtain at least one PLMN available for selection from a proximity-based services (ProSe) layer of the remote device, and control the NAS layer of the remote device to select the target PLMN from the at least one PLMN.

10. The remote device according to claim 9, wherein the processor is further configured to:
    control the ProSe layer of the remote device to determine the at least one PLMN based on serving PLMNs of one or more relay devices, PLMNs of a cell of the one or more relay devices, and at least one authorized PLMN of the remote device.

11. The remote device according to claim 10, wherein the processor is further configured to:
    control the ProSe layer of the remote device to determine at least one relay device of the one or more relay devices, wherein a serving PLMN of the at least one relay device belongs to the at least one authorized PLMN of the remote device; and
    control the ProSe layer of the remote device to determine a PLMN in the PLMNs of the cell of the at least one relay device that belongs to the at least one authorized PLMN of the remote device, as the at least one PLMN.

12. The remote device according to claim 10, wherein the processor is further configured to control the ProSe layer of the remote device to obtain first information sent by the one or more relay devices, respectively, wherein the first information comprises a serving PLMN of a corresponding relay device.

13. The remote device according to claim 12, wherein the first information is discovery announce information or discovery response information.

14. The remote device according to claim 10, wherein the at least one authorized PLMN of the remote device is indicated or configured by a policy control function (PCF) entity.

15. The remote device according to claim 9, wherein the processor is further configured to:
control the ProSe layer of the remote device to obtain the target PLMN from the NAS layer of the remote device; and
control the ProSe layer of the remote device to select the target relay device based on the target PLMN.

16. The remote device according to claim 15, wherein the processor is further configured to:
control the ProSe layer of the remote device to determine a first relay device of one or more relay devices as the target relay device, wherein a PLMN of a cell of the first relay device comprises the target PLMN.

17. The remote device according to claim 10, wherein the processor is further configured to control the ProSe layer of the remote device to obtain second information sent by the one or more relay devices, respectively, wherein the second information comprises a PLMN of a cell of a corresponding relay device.

18. A computer readable storage medium for storing a computer program, wherein the computer program causes a computer to perform:
selecting, by a remote device, a target public land mobile network (PLMN); and
selecting, by the remote device, a target relay device based on the target PLMN;
wherein the computer program further causes the computer to perform:
controlling a non-access layer (NAS layer) of the remote device to obtain at least one PLMN available for selection from a proximity-based services (ProSe) layer of the remote device, and controlling the NAS layer of the remote device to select the target PLMN from the at least one PLMN.

\* \* \* \* \*